Figure 2:
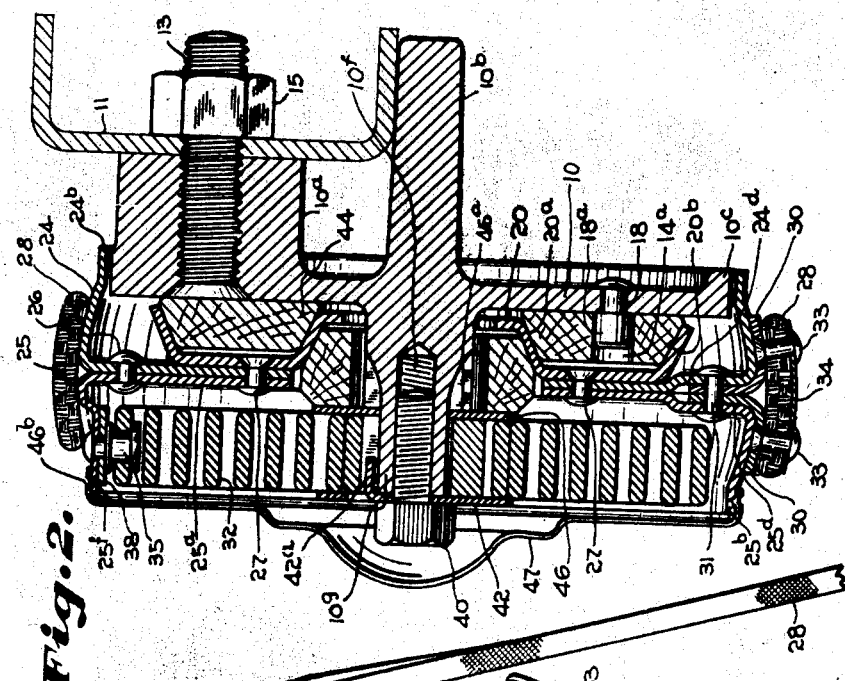

Jan. 19, 1926.

R. H. HASSLER 1,569,976

REBOUND CHECK

Filed Feb. 14, 1925    3 Sheets-Sheet 1

INVENTOR
Robert H. Hassler,
By Raymond F. Buckley.
ATTORNEY

Jan. 19, 1926. 1,569,976
R. H. HASSLER
REBOUND CHECK
Filed Feb. 14, 1925 3 Sheets-Sheet 2

INVENTOR
Robert H. Hassler
BY
Raymond F. Buckley
ATTORNEY

Jan. 19, 1926.
R. H. HASSLER
REBOUND CHECK
Filed Feb. 14, 1925
1,569,976
3 Sheets-Sheet 3
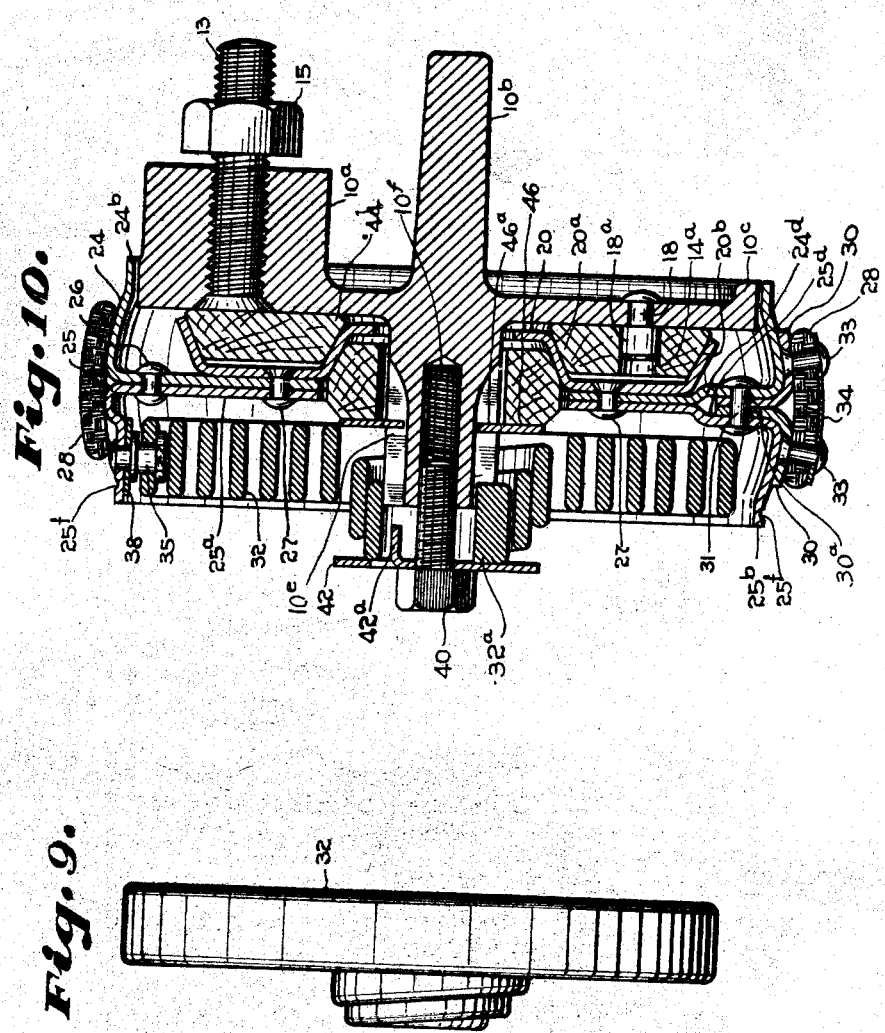
INVENTOR
Robert H. Hassler,
By Raymond F. Buckley.
ATTORNEY Patented Jan. 19, 1926.

1,569,976

UNITED STATES PATENT OFFICE.

ROBERT H. HASSLER, OF INDIANAPOLIS, INDIANA.

REBOUND CHECK.

Application filed February 14, 1925. Serial No. 9,198.

*To all whom it may concern:*

Be it known that I, ROBERT H. HASSLER, a citizen of the United States, residing at Indianapolis, in the county of Marion and State of Indiana, have invented certain new and useful Improvements in Rebound Checks, of which the following is a specification.

This application relates to an improvement in rebound checks described in earlier co-pending applications filed December 27, 1924, Serial No. 758,483, and December 30, 1924, Serial No. 758,872, by Robert H. Hassler, both entitled "Rebound check."

My invention has for its object to produce a simple, compact, efficient, and durable rebound check which is adapted to be connected between two relatively movable members of an automotive vehicle chassis, and which will effectively retard the sudden recoil action of the main suspension springs after they have been compressed. The principal object of this invention is to provide a rebound check of the one-way acting type which can be mounted upon a vehicle chassis and connected by a flexible strap to the axle so that said vehicle will be free to move downwardly as the springs compress. When rebounding from the compressed position, the flexible strap is drawn taut and co-operates with the friction device thereby preventing a rapid upward movement of the spring suspended parts, because a predetermined resistance set up by the friction device must first be overcome.

Another object of the invention is to provide a construction wherein the force or strain to which the rebound check is subjected, is exerted upon the friction creating members.

Still another object of the invention is to provide a novel floating type thrust bearing which is adapted to transmit the pressure from the pressure exerting means to the friction cup.

A still further object of the invention is to provide a novel rebound check spring of the spiral type which allows the outer or large diameter coils to transmit pressure circumferentially, and in which the central coils exert a transverse end pressure.

It is also the object of the invention to provide a rebound check which is simple in construction; strong and durable; which will not easily get out of order; which can be readily applied to vehicles already in use; and furnished as a regular part of the initial equipment thereof; and which can be manufactured at a normal cost and operated efficiently to obtain the desired restraining effect.

The invention may be briefly summarized as consisting of certain novel details of construction, combination and arrangements of parts, which will be described in the specifications and pointed out in the appended claims.

Figure 1:
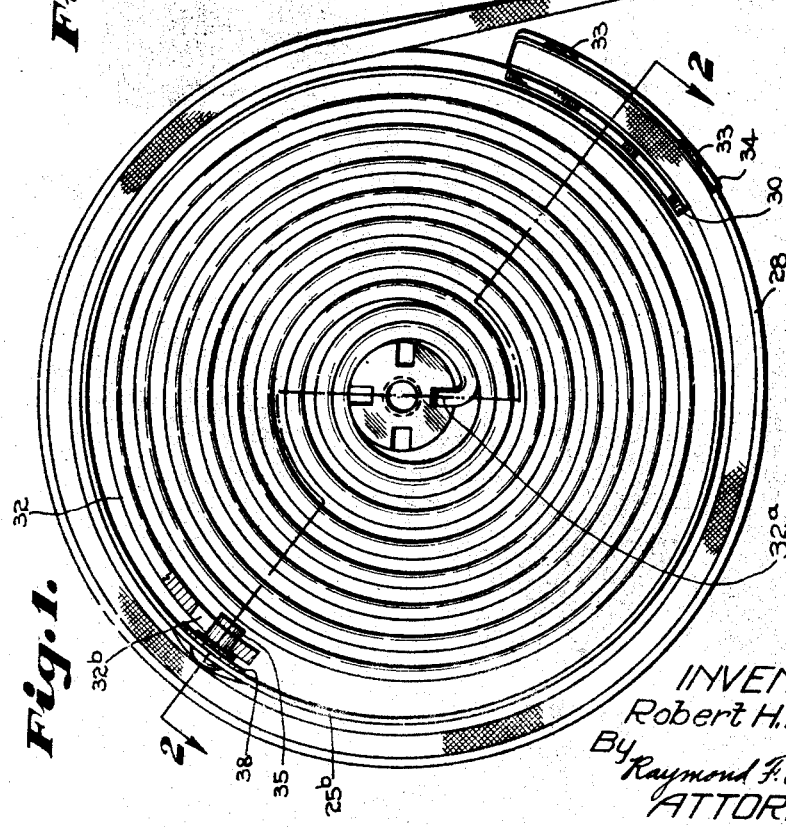
Figure 3:
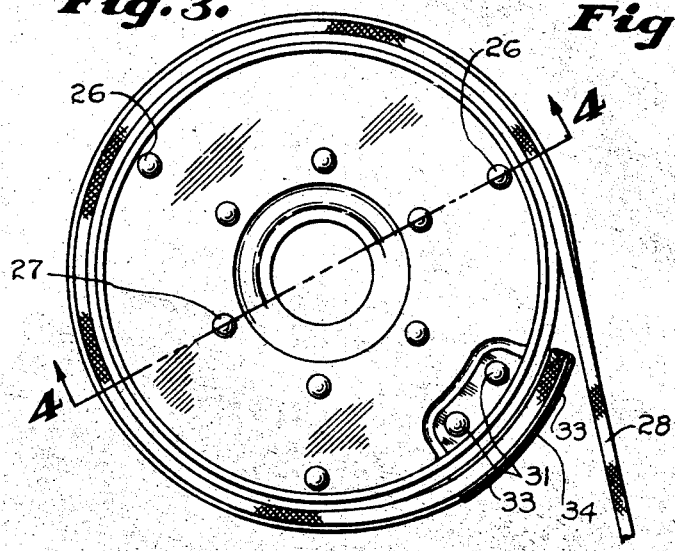
Figure 4:
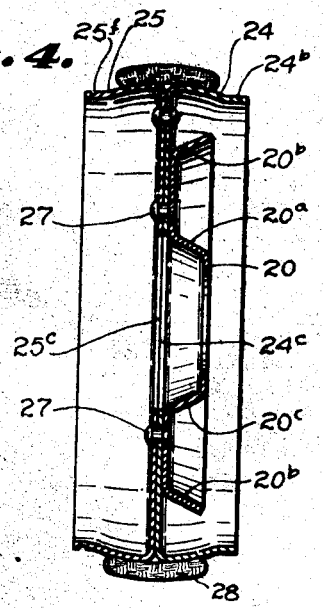
Figure 5:
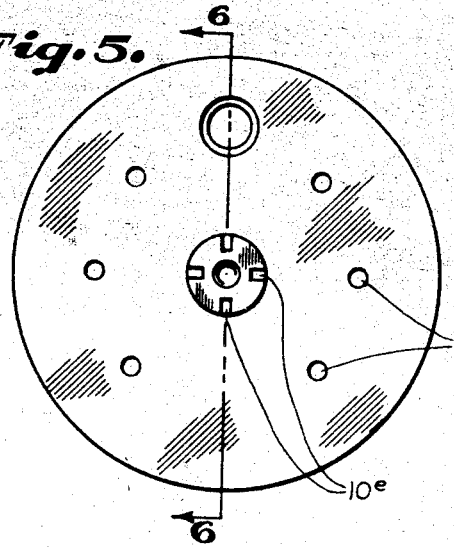
Figure 6:
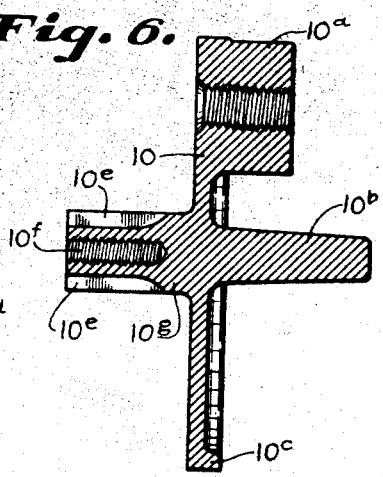
Figure 7:
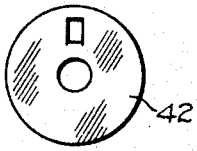
Figure 8:
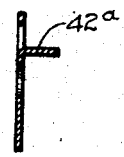

In the accompanying drawings, forming a part of the specifications, Figure 1 illustrates a side elevation of the rebound check assembly, with the cover and some of the smaller parts removed, to illustrate the manner in which the spring assembles in the device. Fig. 2 is a cross-sectional view of Fig. 1 shown mounted on the frame portion of the vehicle chassis and is taken approximately on the line 2—2 in Fig. 1. Figs. 3 to 8 inclusive are drawn at a reduced scale; Fig. 3 being a side elevation of the oscillating drum and illustrating the arrangement of some of the principal parts which connect thereto. Fig. 4 is a cross sectional view of Fig. 3 and is taken on the line 4—4 in Fig. 3. Fig. 5 is a side elevation of the hub support and Fig. 6 is a cross-sectional view of the same, taken on the line 6—6 in Fig. 5. Fig. 7 is a side elevation of the locking washer and Fig. 8 a cross section thereof. Fig. 9 is a full-size end elevation of the rebound check spiral spring. Fig. 10 is a full-size cross-sectional view similar to Fig. 2, but illustrates the spiral spring before being compressed in an operative position.

Referring now to the drawings, 10 represents a hub support, by means of which the rebound check is mounted on the frame 11, and secured thereto by means of a securing bolt 13 and nut 15. The securing bolt 13 has provided on its body external screw threads which engage with internal screw threads in a boss portion $10^a$ formed on the hub support 10. $10^b$ represents an outwardly disposed lug or stop which is adapted to engage against the lower flange of the frame member 11 and thereby prevents independent rotation of the rebound check unit when secured in position on the frame. $10^c$ represents an expanded circular flanged portion which forms a cover for one side of the device, and upon which the friction disk 14 is non-rotatably mounted.

The friction disk is preferably made of a hard wood, impregnated with a lubricating compound. The flanged portion 10ᶜ is provided with a plurality of apertures 10ᵈ into which are inserted a plurality of dowel pins 18, these being preferably riveted in place. These pins are provided with enlarged portions on one extremity, indicated by the ordinal 18ᵃ, which are tightly fitted to and inserted in a series of apertures 14ᵃ provided in the friction ring 14. These pins, when inserted in place, prevent independent rotation of the friction ring 14 with respect to the hub support 10. 20 represents a conical friction cup which has provided therein a pair of conical friction surfaces; 20ᵃ indicating the small diameter surface and 20ᵇ the large diameter surface. It will be observed that the small conical surface 20ᵃ is inverted with respect to the large surface 20ᵇ. They are adapted to snugly engage with mating conical surfaces which are provided on the friction ring 14. The friction cup 20 is non-rotatably mounted on a pair of cup-shaped members 24 and 25 respectively by means of a plurality of rivets 27. The members 24 and 25 are provided with flat circular disk portions 24ᵃ and 25ᵃ respectively, each of which blend into outwardly disposed flanges 24ᵇ and 25ᵇ respectively. The disk portions are arranged adjacent one another and are secured together, in the present instance, by a plurality of rivets 26 and 27; the rivets 27 also serving to attach the friction cup in operative position on member 24. The disks 24ᵃ and 25ᵃ have provided in their central portions large apertures 24ᶜ and 25ᶜ respectively.

28 represents a flexible belt or strap which operates on the external surface of the drum or pulley portion which is formed due to the relative position of the flanges 24ᵇ and 25ᵇ. Depressions or pocket portions 24ᵈ and 25ᵈ are formed in the members 24 and 25 respectively, which provide means into which the flexible strap can be anchored. A strap anchor plate 30 is held securely therein by means of rivets 31—31 which are inserted into apertures 30ᵃ—30ᵃ in the anchor plate 30 and in mating apertures in the pockets 24ᵈ and 25ᵈ respectively. The flexible strap at one extremity is secured to the anchor plate 30 by means of a plurality of rivets 33 and a clamping plate 34.

32 represents a spiral spring which is anchored at its outer extremity to a headed pin 35; the pin being securely anchored to the flange 25ᵇ. A flat circular washer 38 reinforces the flange 25ᵇ. A predetermined number of the smaller convolutions of the spring are pushed outwardly, when forming the spring and before tempering, which convolutions are illustrated in Fig. 10, and when they are forced into a flattened position, illustrated in Fig. 2, a resistance or an end pressure is exerted by the spring. This end pressure is utilized for the purpose of forcing the friction cup 20 in frictional engagement with the ring 14.

10ᵍ represents a cylindrical hub portion which is horizontally disposed from the central flange or disk portion 10ᶜ of the supporting member 10. The hub is provided with a plurality of grooves 10ᵉ. 40 represents a cap screw which engages in a hollow threaded portion 10ᶠ provided in the horizontal axis of the hub 10ᵍ.

42 represents a pressure plate which is interposed between the central pressure exerting coils of the spring 32 and the head of the cap screw 40. It has a transversely disposed ear 42ᵃ which is inserted in one of the grooves and thereby prevents the washer from rotating therein, due to the rotary action of the spiral spring.

44 represents a thrust bearing which I have provided to be interposed between the friction cup 20 and the pressure exerting portion of the spring 32, which protects the adjacent face of the thrust bearing. The thrust bearing is preferably made of a hard wood which is impregnated with a lubricating compound rendering it self-lubricating. A flat circular washer 46 is interposed between the thrust bearing and the pressure exerting coils of the spring 32. To prevent independent rotation of the washer 46 on the hub 10ᵍ, it is provided with a plurality of inwardly disposed lugs or keys 46ᵃ which engage with key-ways 10ᵉ in the hub 10ᵍ. The spring 32 is provided with an inwardly disposed lipped portion 32ᵃ at its inner extremity, which engages in one of the slots 10ᵉ of the hub 10ᵍ. The outer extremity of the spring 32 is anchored so as to rotate with the drum; this is effected by providing an aperture 32ᵈ in the spring which permits the spring to be slipped over the head of pin 35.

To exclude road grit, and foreign particles, I have provided a cup-shaped cover 47 which fits snugly on the circular flanged portion 25ᵇ of the member 25. The cover is provided with an annular bead 46ᵇ which mates with and snaps into a groove 25ᶠ formed in the flange 25ᵇ.

The foregoing description makes it obvious that the spiral spring is constructed in such a manner, and the rebound check is so designed, that when the mechanism is placed in operative engagement, it is capable of maintaining a constant tension on the flexible strap which is coiled about the drum. When the spring is assembled in place in the rebound check, it must be compressed from the free length as illustrated in Fig. 9, to the compressed position as illustrated in the cross-sectional view in Fig. 2. In compressing the spring in this manner, it creates a pressure or end thrust which is available for forcing the friction cup 20 against the friction ring 14.

The spring illustrated in the drawings of my present invention, shows the larger or outer convolutions free to exert only a torsional pull. The inner or small diameter coils are either wound in the position illustrated in Figs. 9 and 10, or forced and held in that position before the tempering operation. When they are compressed flat, as illustrated in Fig. 2, the pressure exerted, or the transverse strain to which the spring is subjected, is limited to only the convolutions which are in the transverse position. It has been found that by limiting the torsional work of the spring to only the outer coils, and that by relying only on the small central coils for exerting an end pressure, that the life of the spring is lengthened to a very marked degree.

This construction also enables the large convolutions of the spring to maintain both a horizontal and vertical alignment, as illustrated in Fig. 2, inasmuch as the presence of combined stresses are absent.

The torsion spring is so disposed that it tends constantly to wind up the strap upon the drum or flange. Therefore, when the main springs of the vehicle, to which the device is attached, are compressed, the slack of the strap is taken up by the rebound check mechanism; the torsion spring being made with sufficient pulling capacity, and adjustable, so that it can be set to give sufficient pulling force to overcome the predetermined frictional resistance. As the regular action of the main spring occurs, it rotates the drum, the speed of which is retarded by means of the frictional drag which takes place between the friction creating members 14 and 20. The amount of frictional resistance set up by these friction members, depends upon the predetermined compressive strength of the spring, which exerts an end thrust that forces the friction elements together.

The amount of frictional resistance set up by the members 14 and 20 can be governed by either increasing or decreasing the compressive pressure of the spiral spring.

The spiral spring is preferably made of flattened material but similar results can be obtained by forming the spring of round wire or of material of any desirable shape.

It is thus seen that the invention provides a simple, compact and durable construction requiring but comparatively few parts; one which will not easily get out of order; one which may be readily placed upon vehicles already in use; one in which the spring serves simultaneously as a torsion and compression spring.

While I have illustrated and described with particularity, only a single preferred form of my invention, I do not desire to be limited to the exact structural details thus illustrated and described but intend to cover all forms and arrangements which come within the terms employed in the definition of my invention constituting the appended claims.

I claim:—

1. In a rebound check, an oscillating drum, a friction element, means for oscillating the drum, spring means for maintaining pressure on the friction element, said means consisting of a spirally wound member, the larger diameter convolutions exerting a torsional pull and the central convolutions exerting an axial pressure.

2. In a rebound check, the combination of a rotatable frictionally resisted drum, means for oscillating said drum, spring means creating friction pressure on said drum, said spring means consisting of a spirally wound spring the centre portion of which is axially offset normally for creating end pressure.

3. In a rebound check, an oscillating drum, a friction element co-operating with said drum, a hub member, spring means for creating friction pressure, said spring means having spirally wound convolutions, the central convolutions being normally offset axially and anchored to said hub member.

4. In a rebound check, an oscillating drum, a friction element co-operating with the drum, a hub member, spring means for creating friction pressure, a thrust bearing interposed between the spring means and the friction element, said spring means comprising spirally wound convolutions with a normally protuberant central portion.

5. In a rebound check, an oscillating drum, a friction element cooperating with said drum, a spring for forcing said drum against said friction element, said spring having spirally wound convolutions, the central convolutions being normally offset axially, a pressure transmitting plate interposed between said spring and said drum, said plate having a diameter at least as great as the diameter of the offset convolutions, and means for flattening the offset convolutions of the spring against the plate.

In witness whereof, I have hereunto set my hand and seal at Indianapolis, Indiana, this 30th day of January, A. D., one thousand nine hundred and twenty-five.

ROBERT H. HASSLER. [L. S.]